(12) United States Patent
Coldicott et al.

(10) Patent No.: US 7,536,603 B2
(45) Date of Patent: *May 19, 2009

(54) MAINTAINING FUNCTIONALITY DURING COMPONENT FAILURES

(75) Inventors: Peter Alan Coldicott, Lago Vista, TX (US); George M. Galambos, Montreal (CA); Raman Harishankar, Blacklick, OH (US); Kerrie Lamont Holley, Montara, CA (US); Edward Emile Kelley, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1 day.

This patent is subject to a terminal disclaimer.

(21) Appl. No.: 11/761,423

(22) Filed: Jun. 12, 2007

(65) Prior Publication Data

US 2008/0082863 A1 Apr. 3, 2008

Related U.S. Application Data

(63) Continuation of application No. 10/857,741, filed on May 28, 2004, now Pat. No. 7,340,651.

(51) Int. Cl.
*G06F 11/00* (2006.01)

(52) U.S. Cl. .............................. 714/38; 714/2; 714/39; 717/171

(58) Field of Classification Search ............... 714/38, 714/39, 2
See application file for complete search history.

(56) References Cited

U.S. PATENT DOCUMENTS

| | | | |
|---|---|---|---|
| 6,675,295 B1* | 1/2004 | Marcelais et al. | 713/2 |
| 6,701,454 B1* | 3/2004 | Fischer et al. | 714/15 |
| 2003/0093516 A1* | 5/2003 | Parsons et al. | 709/224 |
| 2004/0181685 A1* | 9/2004 | Marwaha | 713/201 |
| 2004/0250170 A1* | 12/2004 | Glerum et al. | 714/38 |
| 2004/0267729 A1* | 12/2004 | Swaminathan et al. | 707/3 |

* cited by examiner

*Primary Examiner*—Christopher S McCarthy
(74) *Attorney, Agent, or Firm*—VanLeeuwen & VanLeeuwen; David A. Mims, Jr.

(57) ABSTRACT

Maintaining functionality during component failures is presented. During application registration, a recovery engine generates a recovery plan for the application. The recovery plan includes recovery actions that correspond to each component that the application intends to access. When an application encounters an unavailable component, the recovery engine provides a recovery action to the application which instructs the application how to proceed, such as accessing a backup component. The recovery engine tracks unavailable components and, when a subsequent application registers that intends to use an unavailable component, the recovery engine provides the subsequent application a recovery action, instructing the subsequent application how to proceed.

7 Claims, 6 Drawing Sheets

MAINTAINING FUNCTIONALITY DURING COMPONENT FAILURES

RELATED APPLICATION

This application is a continuation of application Ser. No. 10/857,741 filed May 28, 2004, now U.S. Pat. No. 7,340,651 titled "System and Method for Maintaining Functionality During Component Failures," and having the same inventors as the above-referenced application.

BACKGROUND OF THE INVENTION

1. Technical Field

The present invention relates in general to maintaining functionality during component failures. More particularly, the present invention relates to providing component access alternatives to an application when one of the applications encounters an unavailable component.

2. Description of the Related Art

Computer applications are becoming increasingly complex. In the process of becoming more complex, computer applications are also becoming more dependent upon outside components, such as databases and other applications. During a large application's operation, the application may launch other applications and access many databases. In a distributed computer system, an application may launch these components on servers that may be located in a different office complex.

A challenge found, however, is that components that an application depends may become unavailable. For example, an application may attempt to access a database and discover that the database is not responding possibly due to a database interface failure. When an application encounters an unavailable component, the application attempts to recover from the encounter, which typically involves attempting to access the same component a second time. If the application is unsuccessful, the application tends to take an "all or nothing" approach. Either the application completely restarts, or, if the failure is severe, an entire server or set of servers on which the application executes is restarted. In today's business environment where more and more businesses depend upon continuous availability of computer application systems, this is an invasive and time-consuming approach to managing application availability.

Another challenge is developing as systems evolve in support of the extremely dynamic nature of today's business environment. In order to fit this need, applications are becoming less aware of the computer infrastructure on which they run. Technologies such as Virtualization, Automated Provisioning of new servers in real time, and automated business process orchestration make it more difficult to develop component failure contingency plans in advance without a "flexible manager" function to address real outage situations as they arise.

What is needed, therefore, is a system and method for an application to continue operation when the application encounters an unavailable component by offering the application an alternative action to perform.

SUMMARY

It has been discovered that the aforementioned challenges are resolved by providing an application with alternative operating instructions when the application encounters an unavailable component. During application registration, a recovery engine generates a recovery plan for the application. The recovery plan includes recovery actions that correspond to each component that the application intends to access. When an application encounters an unavailable component, the recovery engine provides a recovery action to the application which instructs the application how to proceed, such as accessing a backup component. For example, if an application detects a specific database interface failure, the recovery engine may instruct the application to access a backup copy of the database, run in degraded mode without the database, or place database transaction requests onto a queue for future processing when the database recovers.

A first application sends a registration request that includes a profile to the recovery engine. The profile includes component links that the first application plans to access, such as a database. The recovery engine uses business rules to generate a recovery action for each component, and stores the recovery actions in a recovery plan.

The first application begins to execute, and sends a request to a component, such as component "X", in an effort to access component X. For example, component X may be a database interface that has failed. In this example, component X does not send a response to the first application. As a result, the first application sends a "component alert" to the recovery engine, informing the recovery engine of component X's unavailability.

In turn, the recovery engine retrieves the first application's recovery plan and identifies a recovery action that corresponds to component X's unavailability. The recovery engine sends the identified recovery action to the first application, which instructs the first application to access an alternative component, such as a back-up component. The first application sends a request to the back-up component which, in turn, sends a response to the first application. In addition to sending the recovery action to the first application, the recovery engine stores a component identifier corresponding to component X in a tracking look-up table. The recovery engine uses the tracking look-up table during subsequent application registrations to identify unavailable components. In one embodiment, the recovery engine may also store the tracking look-up table in internal memory for faster data access.

The first application continues executing, and launches a second application. The second application sends a registration request to the recovery engine in order to register with the recovery engine. In turn, the recovery engine retrieves the business rules and begins to generate a recovery plan for the second application. During the registration process, the recovery engine identifies the availability of each component that the second application intents to access by looking-up each component in the tracking look-up table, as well as pinging each component. The recovery engine determines that the second application intends to use component X by detecting the corresponding component identifier in the tracking look-up table. The recovery engine generates and stores a recovery plan for the second application, and sends a recovery action to the second application that instructs the second application to access the back-up component instead of accessing component X. The first application and the second application continue to access the back-up component until they finish executing, or until they are instructed to start using component X once component X becomes available.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
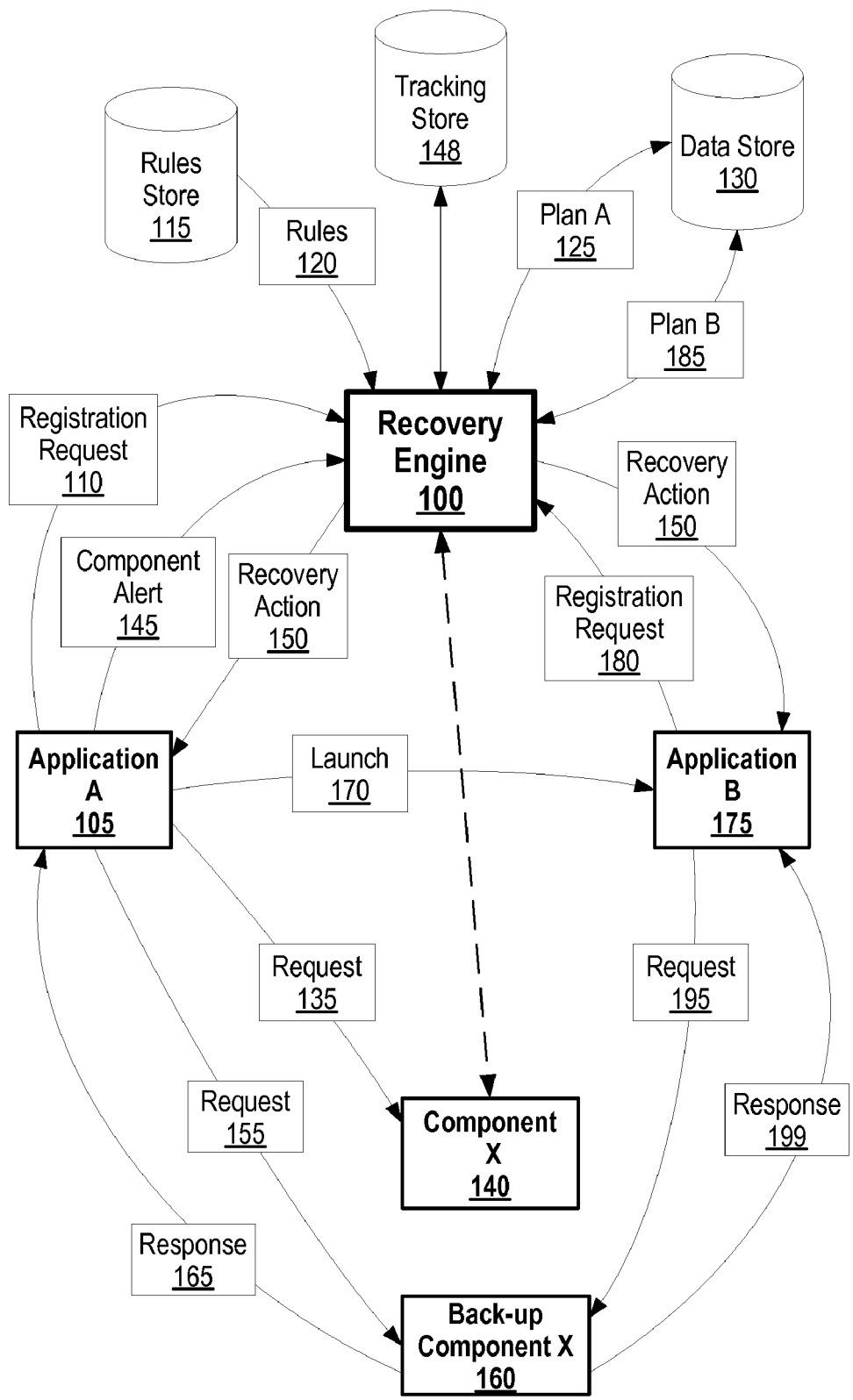
FIG. 1 is a diagram showing a recovery engine generating recovery plans and providing recovery actions to applications.

FIG. 1 is a diagram showing a recovery engine generating recovery plans and providing recovery actions to applications. Recovery engine 100 generates recovery plans that include recovery actions which correspond to particular components. When an application informs recovery engine 100 of an unavailable component, recovery engine 100 provides a recovery action to the application that corresponds to the component. For example, if an application detects a specific database interface failure, recovery engine 100 may instruct the application to access a backup copy of the database, run in degraded mode without the database, or place database transaction requests onto a queue for future processing when the database recovers.

Application A 105 sends registration request 110 that includes a profile to recovery engine 100. The profile includes component links which application A 105 plans to access, such as a database. Recovery engine 100 retrieves rules 120 from rules store 115 that includes business rules for generating a recovery action (see FIG. 3 and corresponding text for further details regarding registration details). During registration, recovery engine 100 may ping the component links included in the profile, such as component X 140, to verify that each component is available.

Figure 4:
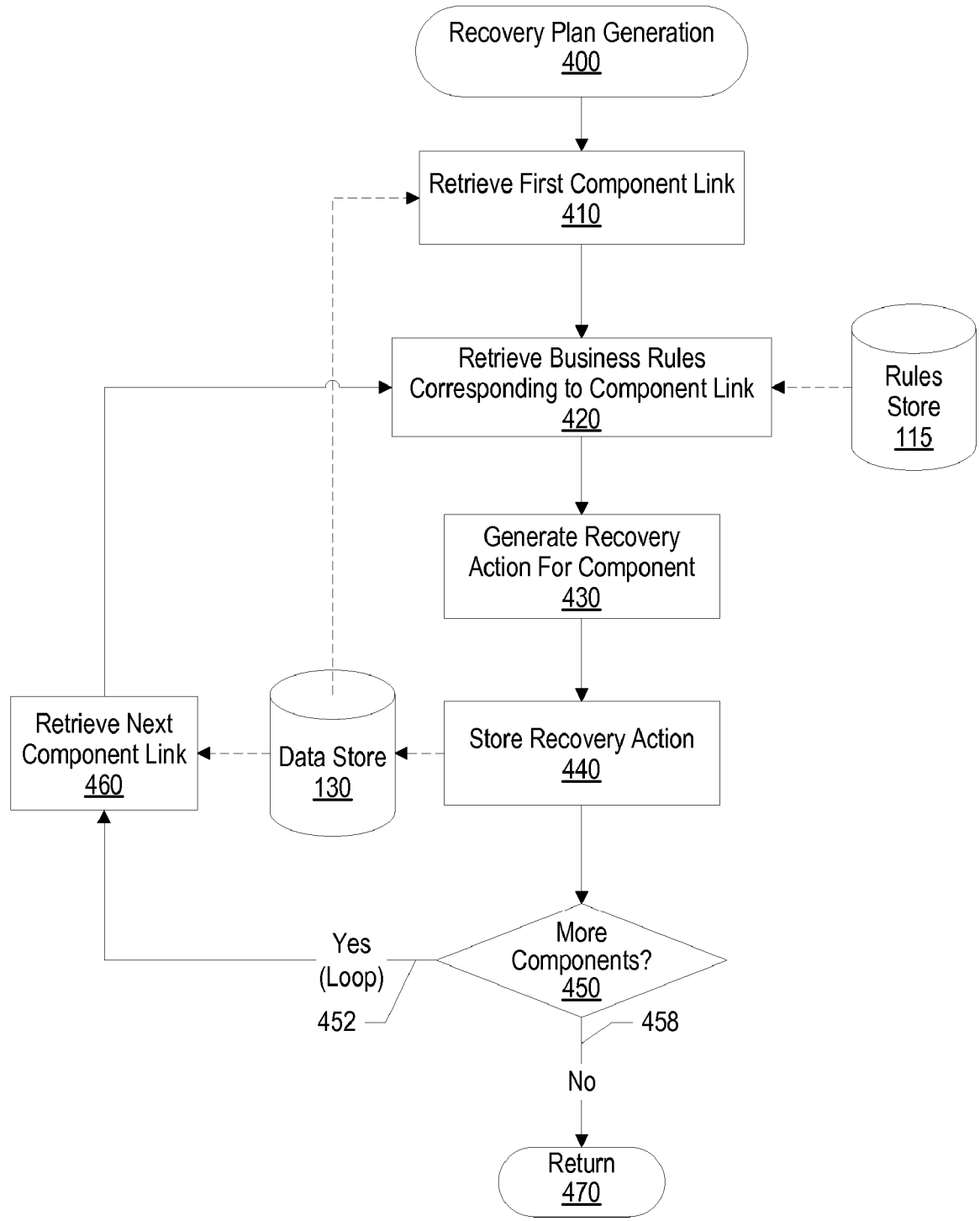
FIG. 4 is a detail level flowchart showing steps taken in generating a recovery plan for an application.

Recovery engine 100 generates a recovery plan for application A 105, which includes a recovery action for each component link, and stores plan A 125 in data store 130 (see FIG. 4 and corresponding text for further details regarding recovery plan generation). Plan A 125 includes recovery actions which describe alternative actions for application A 105 to execute when application A 105 identifies an unavailable component. For example, if application A 105 fails to access a particular database, a recovery action may instruct application A 105 to access a backup database. Rules 115 and recovery plan store 130 may be stored on a nonvolatile storage area, such as a computer hard drive.

Once registered, application A 105 begins execution and sends request 135 to component X 140 in an effort to access component X 140. For example, component X 140 may be a database interface. In this example, component X 140 is unavailable and does not send a response to application A 105. As a result, application A 105 sends component alert 145 to recovery engine 100, which informs recovery engine 100 of component X 140's unavailability.

Figure 5:
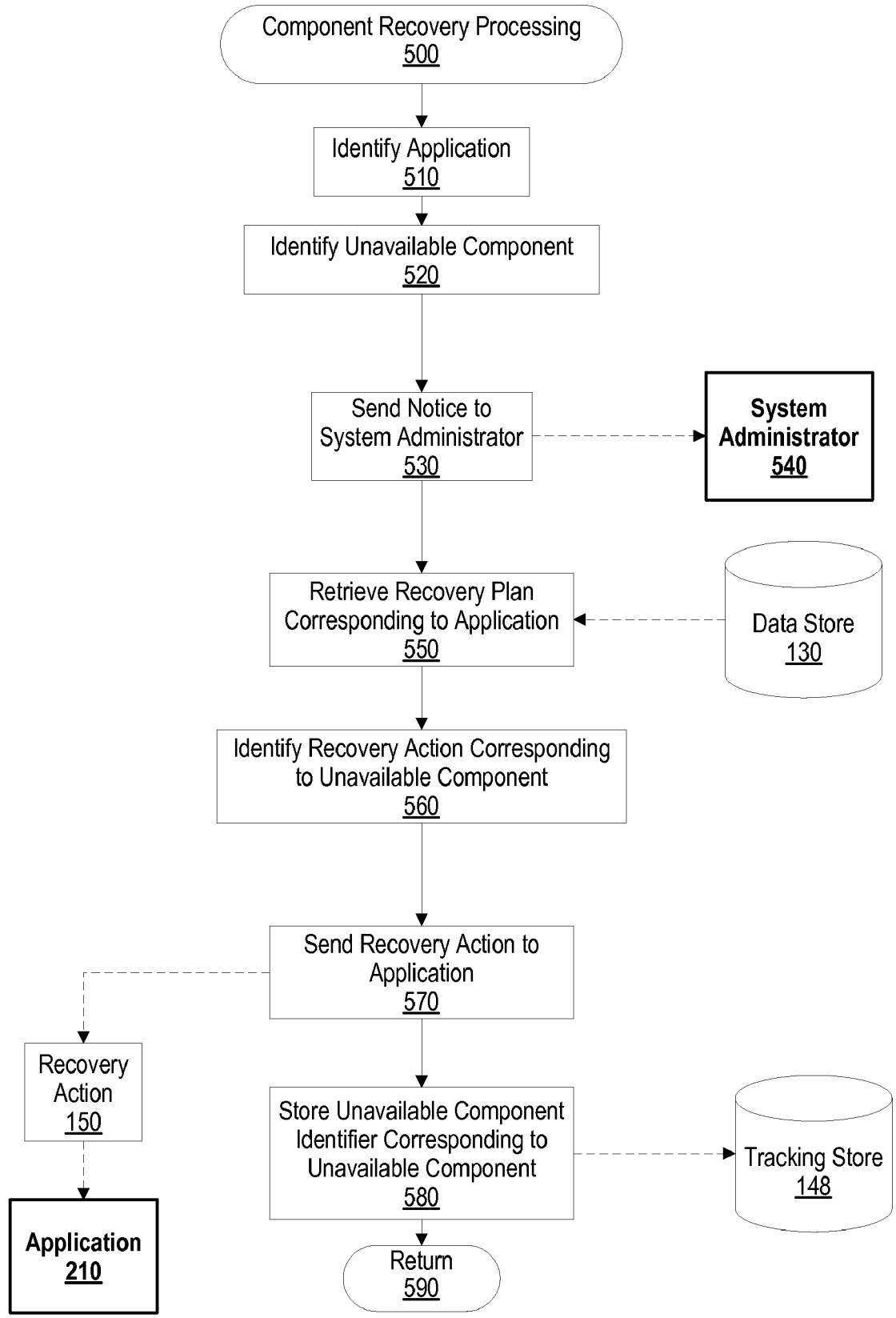
FIG. 5 is a detail level flowchart showing steps taken in processing a recovery action that corresponds to an unavailable component.

Recovery engine 100 retrieves plan A 125 from data store 130 and identifies a recovery action included in plan A 125 that corresponds to component X 140's unavailability (see FIG. 5 and corresponding text for further details regarding component recovery processing). Recovery engine 100 sends recovery action 150 to application A 105 which instructs application A 105 to access an alternative component, such as back-up component X 160. Application A 105 sends request 155 to back-up component X 160 which, in turn, sends response 165 to application A 105. In addition to sending recovery action 150 to application A 105, recovery engine 100 stores a component identifier corresponding to component X 140 in a tracking look-up table located in tracking store 148. Recovery engine 100 uses the tracking look-up table during subsequent application registrations to identify unavailable components (see below for further details). In one embodiment, recovery engine 100 may also store the tracking look-up table in internal memory for faster data access.

Application A 105 continues executing, and sends launch 170 to application B 175 which launches application B 175. Application B 175 sends registration request 180 to recovery engine 100 in order to register with recovery engine 100. In turn, recovery engine 100 retrieves rules 120 from rules store 115 and begins to generate a recovery plan for application B 175. During the registration process, recovery engine 100 identifies the availability of each component that application B 175 intents to access by looking-up each component in the tracking look-up table, as well as pinging the components. Recovery engine 100 determines that application B 175 intends to use component X 140 which has a corresponding component identifier in the tracking look-up table which indicates that component X 140 is unavailable. Recovery engine 100 generates and stores a recovery plan (e.g. plan B 185) and sends recovery action 150 to application B 175 that instructs application B 175 to access back-up component X 160 instead of component X 140.

Application B 175 sends request 195 to back-up component X 160 which, in turn, sends response 199 to application B 175. Application A 105 and application B 175 continue to access back-up component X 160 until they finish executing, or until they are instructed to start using component X 140 once component X 140 becomes available.

Figure 2:
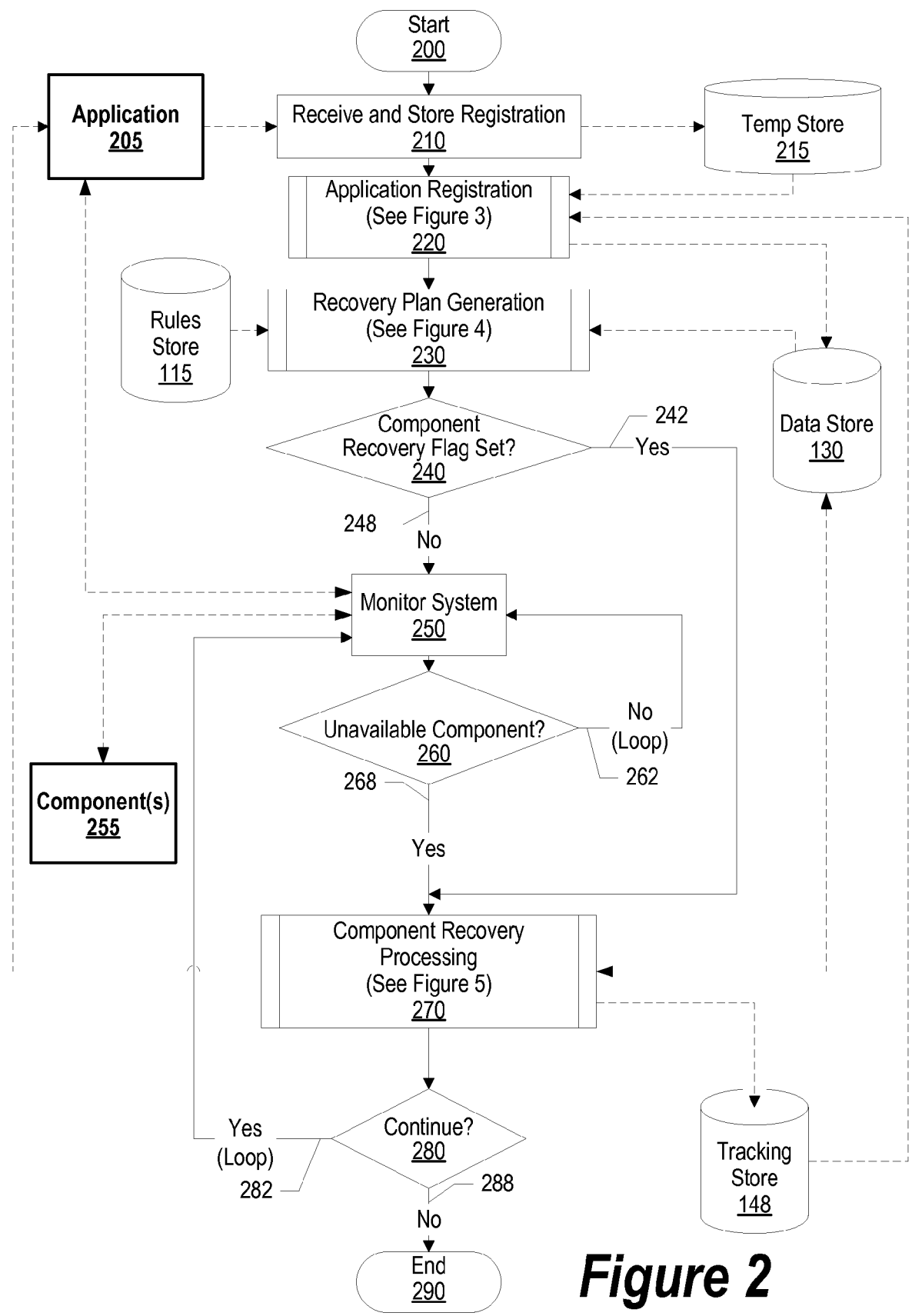
FIG. 2 is a high-level diagram showing steps taken in generating a recovery plan and providing recovery actions to an application.

FIG. 2 is a high-level diagram showing steps taken in generating a recovery plan and providing recovery actions to an application. Processing commences at 200, whereupon processing receives a registration request from application 205, and stores the registration request in temp store 215 (step 210). The registration request includes a list of component links that application 205 plans to access. Temp store 215 may be stored on a nonvolatile storage area, such as a computer hard drive.

Processing registers application 205 and, during application registration, processing stores the component link information in data store 130 that identifies the operability of each component that is specified in the registration request. If one of the components is unavailable, processing sets a "component recovery flag" which indicates that a recovery action is required for an unavailable component (pre-defined process block 220, see FIG. 3 and corresponding text for further details). Data store 130 is the same as that shown in FIG. 1 and may be stored on a nonvolatile storage area, such as a computer hard drive.

Once application 205 is registered, processing uses information gathered during the registration process to generate a recovery plan. Processing uses business rules that are retrieved from rule store 115, as well as component information that is retrieved from data store 130, in order to generate the recovery plan (pre-defined process block 230, see FIG. 4 and corresponding text for further details).

A determination is made as to whether the component recovery flag was set during application registration, signifying that a recovery action is required for one of the components (decision 240). If the component recovery flag is set, decision 240 branches to "Yes" branch 242 whereupon the recovery action is identified and processed (pre-defined process block 270, see FIG. 5 and corresponding text for further details). On the other hand, if the component recovery flag is not set, decision 240 branches to "No" branch 248 whereupon processing monitors components 255 and application 205 (step 250). For example, processing may monitor components 255 by invoking a "heartbeat" ping to each component to ensure that each component available, and processing may monitor application 205 by checking for component alerts sent from application 205.

A determination is made as to whether there is an unavailable component (decision 260). If there is not an unavailable component, decision 260 branches to "No" branch 262 which loops back to continue to monitor the computer system. This looping continues until an unavailable component is detected, at which point decision 260 branches to "Yes" branch 268 whereupon processing identifies a recovery action corresponding to the unavailable component, sends the recovery action to application 205, and logs the unavailable component in a look-up table located in tracking store 148 (pre-defined process block 270, see FIG. 5 and corresponding text for further details).

A determination is made as to whether to continue recovery processing (decision 280). If recovery processing should continue, decision 280 branches to "Yes" branch 282 which loops back to continue to monitor the system. This looping continues until recovery processing should stop, at which point decision 280 branches to "No" branch 288 whereupon processing ends at 290.

Figure 3:
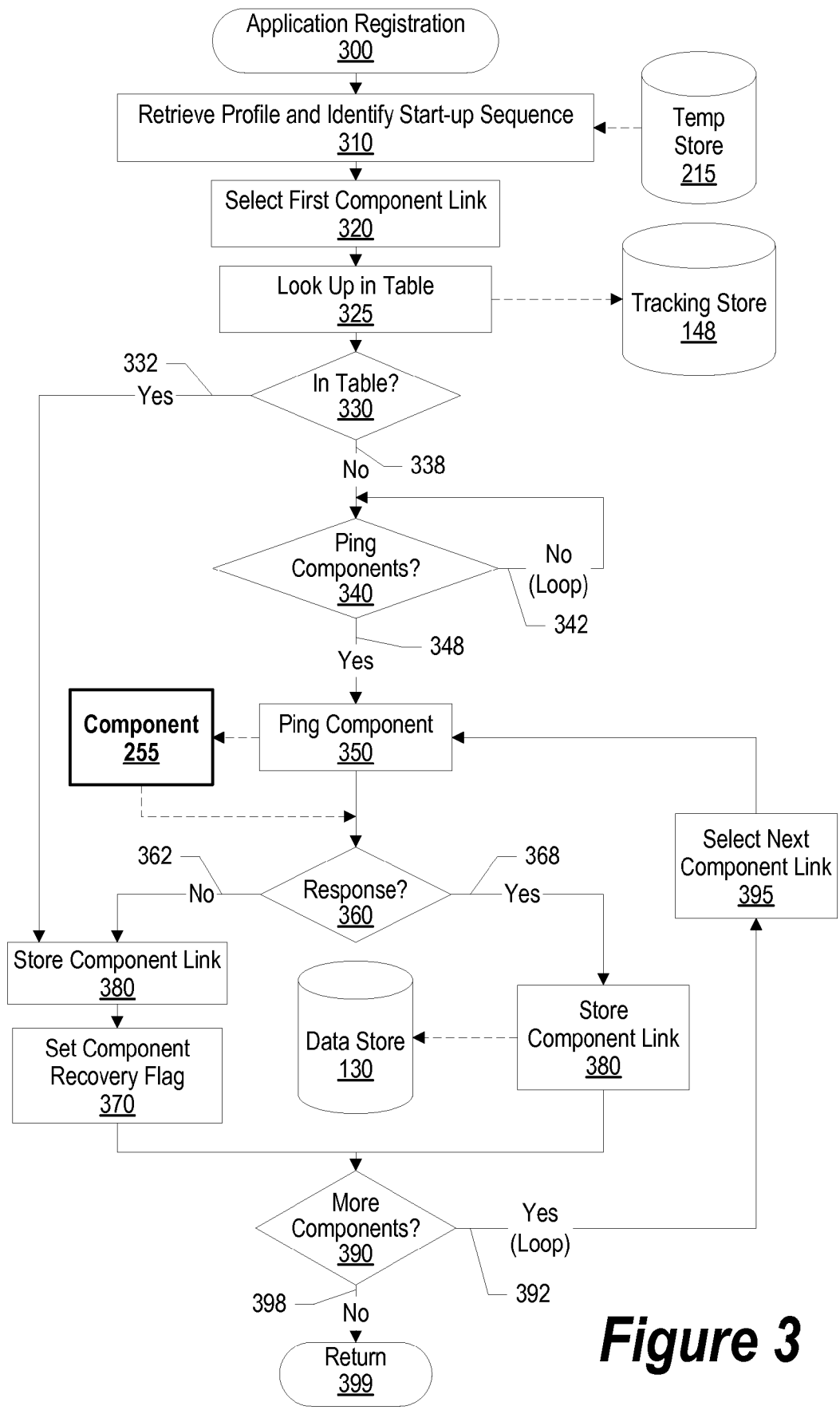
FIG. 3 is a detail level flowchart showing steps taken in registering an application.

FIG. 3 is a detail level flowchart showing steps taken in registering an application. Application registration commences at 300, whereupon processing retrieves the application's profile from temp store 215 and identifies whether the profile includes a start-up sequence (step 310). For example, the application may initialize the components it plans to access, and the application requires time to perform the initialization steps before the recovery engine accesses the components.

At step 320, processing selects the first component link that is included in the profile, and looks-up the component link in a tracking look-up table located in tracking store 148 to identify whether the component has been logged as being unavailable. For example, if an application attempted to access the component and the component did not respond, the application sent a component alert to a recovery engine which, in turn, stored a component identifier corresponding to the component in the tracking look-up table in order to track the unavailable component (see FIG. 5 and corresponding text for further details regarding component identifier storage steps).

A determination is made as to whether the component has a corresponding component identifier located in the tracking look-up table (decision 330). If the first component has a corresponding component identifier in the tracking look-up table, decision 330 branches to "Yes" branch 332 whereupon processing stores the component link in data store 130 (step 365), and sets a component recovery flag that indicates that a recovery action is required for the unavailable component (step 370). On the other hand, if the component does not have a corresponding component identifier located in the tracking look-up table, decision 330 branches to "No" branch 348.

A determination is made as to whether to ping the first component (step 340). For example, if a start-up sequence is specified, processing may be required to wait until the start-up sequence is complete before pinging the component. If processing should not ping the component, decision 340 branches to "No" branch 342 which loops back to wait to ping the components. This looping continues until processing should ping the component (i.e. the start-up sequence is complete), at which point decision 320 branches to "Yes" branch 348 and pings component 255 at step 350. Component 255 is the same as that shown in FIG. 2.

A determination is made as to whether component 255 responds to the ping (decision 360). If component 255 does not respond, decision 360 branches to "No" branch 362 whereupon processing stores the component link in data store 130 (step 365), and sets a component recovery flag (step 370). On the other hand, if component 255 responds to the ping, decision 360 branches to "Yes" branch 368 whereupon processing stores the component link in data store 130 at step 380.

A determination is made as to whether there are more components to ping (decision 390). If there are more components to ping, decision 390 branches to "Yes" branch 392 whereupon processing selects (step 395) and processes the next component. This looping continues until there are no more components to ping, at which point decision 390 branches to "No" branch 398 whereupon processing returns at 399.

FIG. 4 is a detail level flowchart showing steps taken in generating a recovery plan for an application. Processing commences at 400, whereupon processing retrieves a first component link from data store 130 (step 410). Component links that correspond to the application were stored in data store 130 during the application's registration. For example, if the application is an automated teller machine, one of the component links would correspond to accessing a client account database with the intent to update the database in support of the ability to withdraw funds from a client's account (see FIG. 3 and corresponding text for further details regarding registration steps). Data store 130 is the same as that shown in FIG. 1 and may be stored on a nonvolatile storage area, such as a computer hard drive.

Processing retrieves business rules that correspond to the first component link from rules store 115 at step 420. Using the example described above, if the client database is unavailable, a business rule may allow a user to withdraw up to $100 each day. Processing generates a recovery action using the retrieved business rules at step 430, and stores the recovery action in data store 130 at step 440. Using the example described above, a recovery action may instruct the application to store withdraws in a local storage area, and update the client database when the client database becomes available.

A determination is made as to whether there are more component links located in data store 130 to generate a recovery action (decision 450). If there are more component links, decision 450 branches to "Yes" branch 452 which loops back to retrieve (step 460) and process the next component link. This looping continues until there are no more component links to process, at which point decision 450 branches to "No" branch 458 whereupon processing returns at 470.

FIG. 5 is a detail level flowchart showing steps taken in processing a recovery action that corresponds to an unavailable component. Processing commences at 500, whereupon processing identifies an application that requires the recovery action (step 510). At step 520, processing identifies the component that is deemed unavailable either from receiving a component alert from the application or from not receiving a ping response from the component.

Processing sends a message to system administrator 540 informing him of the unavailable component and which application is effected (step 530). At step 550, processing retrieves a recovery plan that corresponds to the identified application from data store 130. The recovery plan includes recovery actions that correspond to components that the identified application access (see FIG. 4 and corresponding text for further details regarding recovery plan generation). Data store 130 is the same as that shown in FIG. 1.

At step 560, processing identifies a recovery action included in the recovery plan that corresponds to the unavailable component. For example, if the unavailable component is a database, the recovery action may instruct an application to use a back-up database. Processing sends recovery action 150 to application 210 at step 570. Recovery action 150 and application 210 are the same as that shown in FIGS. 1 and 2, respectively.

Processing stores a "component identifier" in tracking store 148 at step 580, which is used to identify unavailable components when other applications register (see FIG. 3 and corresponding text for further details regarding application registration). Tracking store 148 is the same as that shown in FIG. 1. Processing returns at 590.

Figure 6:
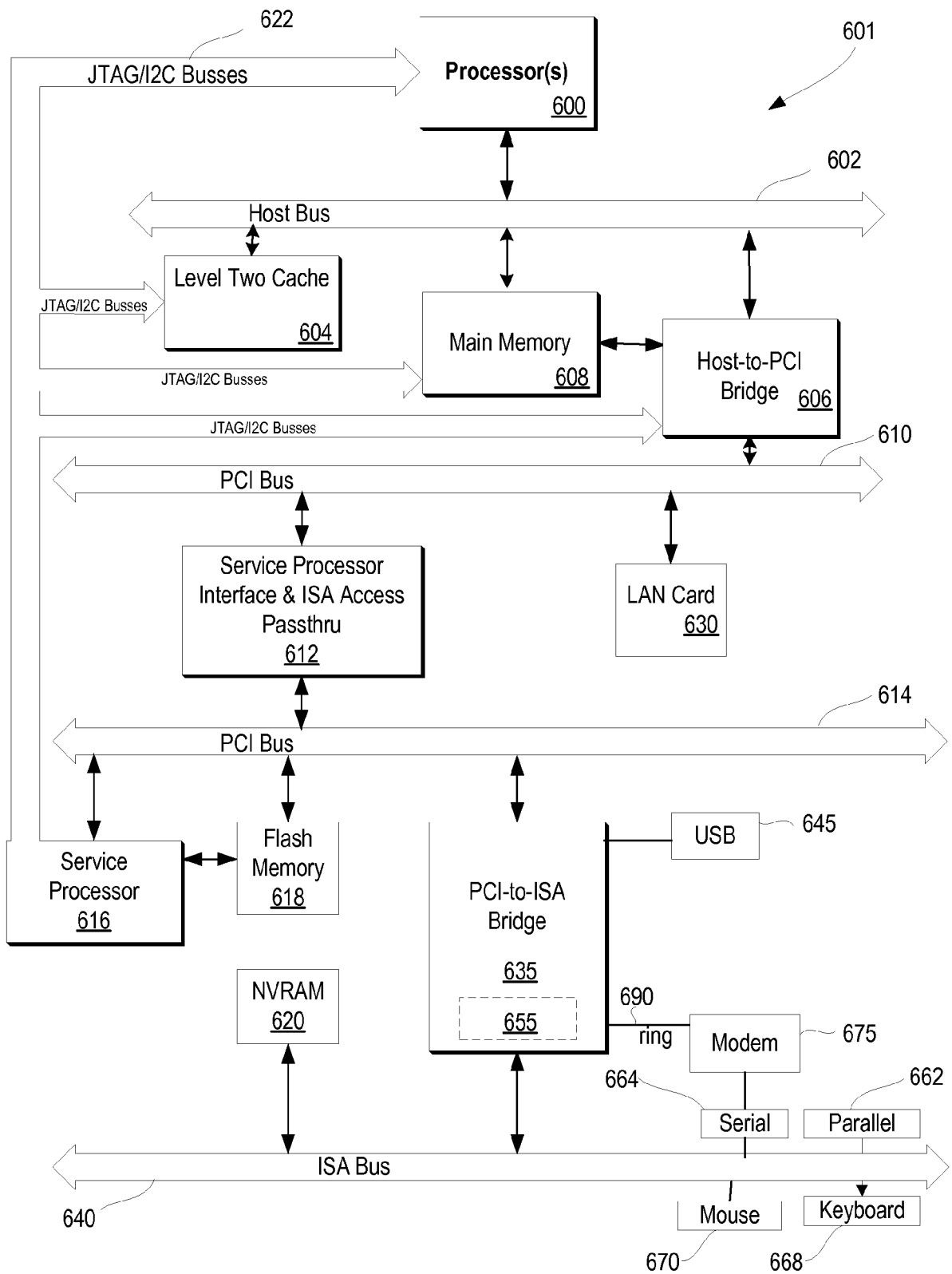
FIG. 6 is a block diagram of an information handling system capable of implementing the present invention.

FIG. 6 illustrates information handling system 601 which is a simplified example of a computer system capable of performing the computing operations described herein. Computer system 601 includes processor 600 which is coupled to host bus 602. A level two (L2) cache memory 604 is also coupled to host bus 602. Host-to-PCI bridge 606 is coupled to main memory 608, includes cache memory and main memory control functions, and provides bus control to handle transfers among PCI bus 610, processor 600, L2 cache 604, main memory 608, and host bus 602. Main memory 608 is coupled to Host-to-PCI bridge 606 as well as host bus 602. Devices used solely by host processor(s) 600, such as LAN card 630, are coupled to PCI bus 610. Service Processor Interface and ISA Access Pass-through 612 provides an interface between PCI bus 610 and PCI bus 614. In this manner, PCI bus 614 is insulated from PCI bus 610. Devices, such as flash memory 618, are coupled to PCI bus 614. In one implementation, flash memory 618 includes BIOS code that incorporates the necessary processor executable code for a variety of low-level system functions and system boot functions.

PCI bus 614 provides an interface for a variety of devices that are shared by host processor(s) 600 and Service Processor 616 including, for example, flash memory 618. PCI-to-ISA bridge 635 provides bus control to handle transfers between PCI bus 614 and ISA bus 640, universal serial bus (USB) functionality 645, power management functionality 655, and can include other functional elements not shown, such as a real-time clock (RTC), DMA control, interrupt support, and system management bus support. Nonvolatile RAM 620 is attached to ISA Bus 640. Service Processor 616 includes JTAG and I2C busses 622 for communication with processor(s) 600 during initialization steps. JTAG/I2C busses 622 are also coupled to L2 cache 604, Host-to-PCI bridge 606, and main memory 608 providing a communications path between the processor, the Service Processor, the L2 cache, the Host-to-PCI bridge, and the main memory. Service Processor 616 also has access to system power resources for powering down information handling device 601.

Peripheral devices and input/output (I/O) devices can be attached to various interfaces (e.g., parallel interface 662, serial interface 664, keyboard interface 668, and mouse interface 670 coupled to ISA bus 640. Alternatively, many I/O devices can be accommodated by a super I/O controller (not shown) attached to ISA bus 640.

In order to attach computer system 601 to another computer system to copy files over a network, LAN card 630 is coupled to PCI bus 610. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer implemented method comprising:
receiving a profile from an application, the profile including a first component link that corresponds to a component;
extracting a start-up sequence from the profile;
identifying a query wait time included in the start-up sequence that corresponds to the component;
querying the component using the first component link in response to identifying the query wait time, wherein the querying is performed after a delay in time corresponding to the query wait time;
receiving a component alert from the application, the component alert corresponding to the component;
retrieving a recovery plan corresponding to the application;
selecting a recovery action included in the recovery plan that corresponds to the component; and
sending the selected recovery action to the application.

2. The method of claim 1 further comprising:
setting a component recovery flag in response to the querying.

3. The method of claim 1 wherein receiving the profile further comprises receiving a registration request from the application that includes the profile.

4. The method of claim 1 further comprising:
storing a component identifier corresponding to the component in a look-up table, the storing corresponding to the unavailability of the component;
receiving a registration request from a subsequent application, wherein the registration request includes a second component link that corresponds to the component;
determining that the component is unavailable based upon the component identifier;
selecting a subsequent recovery action in response to the determination, the subsequent recovery action corresponding to the subsequent application; and
sending the subsequent recovery action to the subsequent application.

5. The method of claim 1 further comprising:
retrieving the first component link, the first component link corresponding to the component;
retrieving one or more business rules that correspond to the first component link;
generating the recovery action using the retrieved business rules; and
including the recovery action in the recovery plan.

6. The method of claim 1 wherein the application is adapted to communicate with a subsequent component in response to receiving the recovery action, the subsequent component identified in the recovery action.

7. The method of claim 1 wherein the method is performed by a service provider.

* * * * *